United States Patent
Kochar

(10) Patent No.: US 9,336,010 B2
(45) Date of Patent: May 10, 2016

(54) MULTI-BOOT OR FALLBACK BOOT OF A SYSTEM-ON-CHIP USING A FILE-BASED BOOT DEVICE

(71) Applicant: Xilinx, Inc., San Jose, CA (US)

(72) Inventor: Yatharth K. Kochar, Hyderabad (IN)

(73) Assignee: XILINX, INC., San Jose, CA (US)

(*) Notice: Subject to any disclaimer, the term of this patent is extended or adjusted under 35 U.S.C. 154(b) by 586 days.

(21) Appl. No.: 13/833,371

(22) Filed: Mar. 15, 2013

(65) Prior Publication Data

US 2014/0281455 A1    Sep. 18, 2014

(51) Int. Cl.
G06F 9/44 (2006.01)
G06F 11/14 (2006.01)
G06F 21/57 (2013.01)

(52) U.S. Cl.
CPC .............. *G06F 9/4401* (2013.01); *G06F 9/441* (2013.01); *G06F 9/4406* (2013.01); *G06F 11/1417* (2013.01); *G06F 21/575* (2013.01)

(58) Field of Classification Search
CPC ..... G06F 9/4401; G06F 9/441; G06F 9/4406; G06F 11/1417; G06F 21/575
See application file for complete search history.

(56) References Cited

U.S. PATENT DOCUMENTS

| | | | |
|---|---|---|---|
| 6,446,203 B1* | 9/2002 | Aguilar | G06F 9/4408 710/10 |
| 2004/0153724 A1* | 8/2004 | Nicholson | G06F 11/0709 714/6.11 |
| 2005/0125396 A1* | 6/2005 | Liu | G06F 17/30067 |
| 2006/0026429 A1 | 2/2006 | Kudo et al. | |
| 2007/0038685 A1 | 2/2007 | Chan et al. | |
| 2008/0141017 A1 | 6/2008 | McCoull et al. | |
| 2008/0256366 A1 | 10/2008 | Dale et al. | |
| 2009/0089570 A1 | 4/2009 | Andrianov | |
| 2009/0204803 A1 | 8/2009 | Cox et al. | |
| 2009/0327680 A1 | 12/2009 | Dale et al. | |
| 2010/0070749 A1 | 3/2010 | Tsai | |
| 2010/0241837 A1 | 9/2010 | Concorso | |
| 2011/0265183 A1 | 10/2011 | Wu et al. | |
| 2012/0191960 A1* | 7/2012 | Piwonka | G06F 9/441 713/2 |
| 2012/0210115 A1 | 8/2012 | Park et al. | |
| 2013/0042098 A1 | 2/2013 | Baik et al. | |

(Continued)

OTHER PUBLICATIONS

Huang, Andrew, "Keeping Secrets in Hardware: the Microsoft Xbox Case Study," AI Memo 2002-008, May 26, 2001, pp. 1-15, Massachusetts Institute of Technology, Artificial Intelligence Lab, Cambridge, Massachusetts, USA.

(Continued)

*Primary Examiner* — Jaweed A Abbaszadeh
*Assistant Examiner* — Terrell Johnson
(74) *Attorney, Agent, or Firm* — W. Eric Webostad; LeRoy D. Maunu

(57) ABSTRACT

A method includes initiating a boot of a system-on-chip coupled to a boot device. The boot is initiated from boot code stored in nonvolatile memory responsive to a power-on-reset. Under control of the boot code: a first register value is loaded into a register; a name string from the boot code is accessed; the first register value is obtained from the register; and the first register value and name string are converted to a first string value, which is provided as a first filename. The boot device is searched for a boot image file with the first filename. If the first filename is not found in the boot device, the first register value is incremented to provide a second register value. The obtaining, converting, and searching are repeated using a second filename generated using the second register value, and a valid filename for the boot image file is iteratively generated.

20 Claims, 3 Drawing Sheets

(56) References Cited

U.S. PATENT DOCUMENTS

2013/0185563 A1 7/2013 Djabarov et al.
2013/0282951 A1* 10/2013 Kuo ...................... G06F 21/575
  711/102

OTHER PUBLICATIONS

U.S. Appl. No. 13/833,177, filed Mar. 15, 2013, Sanders et al.
U.S. Appl. No. 13/775,151, filed Feb. 23, 2013, Peterson et al.
Xilinx, Inc., *Zynq-7000 All Programmable SoC Software Developers Guide*, UG821 (v3.0), Oct. 16, 2012, pp. 1-42, Xilinx, Inc., San Jose, California, USA.
Xilinx, Inc., *Zynq-7000 All Programmable SoC Technical Reference Manual*, UG585 (v1.4), Nov. 16, 2012, Chapters 6, 27, 28, 32 (76 pages), Xilinx, Inc., San Jose, California, USA.
elinux.org, "RPi U-Boot," *Embedded Linux Wiki*, Dec. 2, 2012, web Feb. 18, 2014, <http://elinux.org/index.php?title=RPi_U-boot&oldid=197048&print>.
U.S. Appl. No. 14/019,323, filed Sep. 5, 2013, Sanders et al.

* cited by examiner

MULTI-BOOT OR FALLBACK BOOT OF A SYSTEM-ON-CHIP USING A FILE-BASED BOOT DEVICE

TECHNICAL FIELD

The following description relates to integrated circuit devices ("ICs"). More particularly, the following description relates to a multi-boot or fallback boot of a system-on-chip using a file-based boot device.

BACKGROUND

To boot a system-on-chip ("SoC") of a system using a file-based device, such as a Secure Digital ("SD") card for example, conventionally a user replaced a BOOT.BIN boot image file with an updated or new boot image file on such file-based device whenever a different boot image was to be used by such SoC. This was a time consuming process, which additionally may involve renaming or destroying the prior boot image file. Later, if such a prior boot image file was to be used, the above process was repeated.

Accordingly, it would be useful to provide a less time consuming booting of a file-based device.

SUMMARY

A method relates generally to a multi-boot or fallback boot of a system-on-chip. In such a method, a boot of a system-on-chip coupled to a boot device is initiated. The boot is initiated from boot code stored in nonvolatile memory of the system-on-chip responsive to a power-on-reset. Under control of the boot code the following operations are performed: a first register value is loaded into a register of the system-on-chip; a name string from the boot code is accessed; the first register value is obtained from the register; and the first register value and the name string are converted to a first string value. The first string value is provided as a first filename. The boot device is searched for a boot image file with the first filename. If the first filename is not found in the boot device, the first register value is incremented to provide a second register value. The obtaining, converting, and searching are repeated using a second filename generated using the second register value, and a valid filename for the boot image file is iteratively generated.

A system relates generally to a multi-boot or fallback boot of a system-on-chip. In such a system, a system-on-chip has a central processing unit, on-chip memory, internal nonvolatile memory, a register, and a memory controller. An external nonvolatile memory is coupled to the system-on-chip. The external nonvolatile memory is configured to store files with associated filenames. The internal nonvolatile memory includes executable boot code. The executable boot code is configured, under control of the central processing unit, to: access a name string; load a register value into the register of the system-on-chip; obtain the register value from the register; and convert the register value and the name string to a string value. The string value is provided as a filename. The system-on-chip is coupled to search the external nonvolatile memory for a boot image file with the filename. The system-on-chip is configured to successively increment the register value to successively search the external nonvolatile memory for a valid filename for the boot image file.

A program produce relates generally to a multi-boot or fallback boot of a system-on-chip. Such a program product is embedded in a system-on-chip coupled to a boot device to include: a tangible processing unit-readable storage medium; and a processing unit-readable program stored on the tangible processing unit-readable storage medium. The processing unit-readable program is executed by the system-on-chip for causing the system-on-chip to perform operations. These operations include: loading a first register value into a register of the system-on-chip; obtaining the first register value from the register; obtaining a name string from the processing unit-readable program; and converting the first register value and the name string to a first string value. The first string value is provided as a first filename. The boot device is searched for a boot image file with the first filename. If the first filename is not found in the boot device, the first register value is incremented to provide a second register value. The obtaining, converting, and searching are repeated using a second filename generated using the second register value, and a valid filename for the boot image file is iteratively generated.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
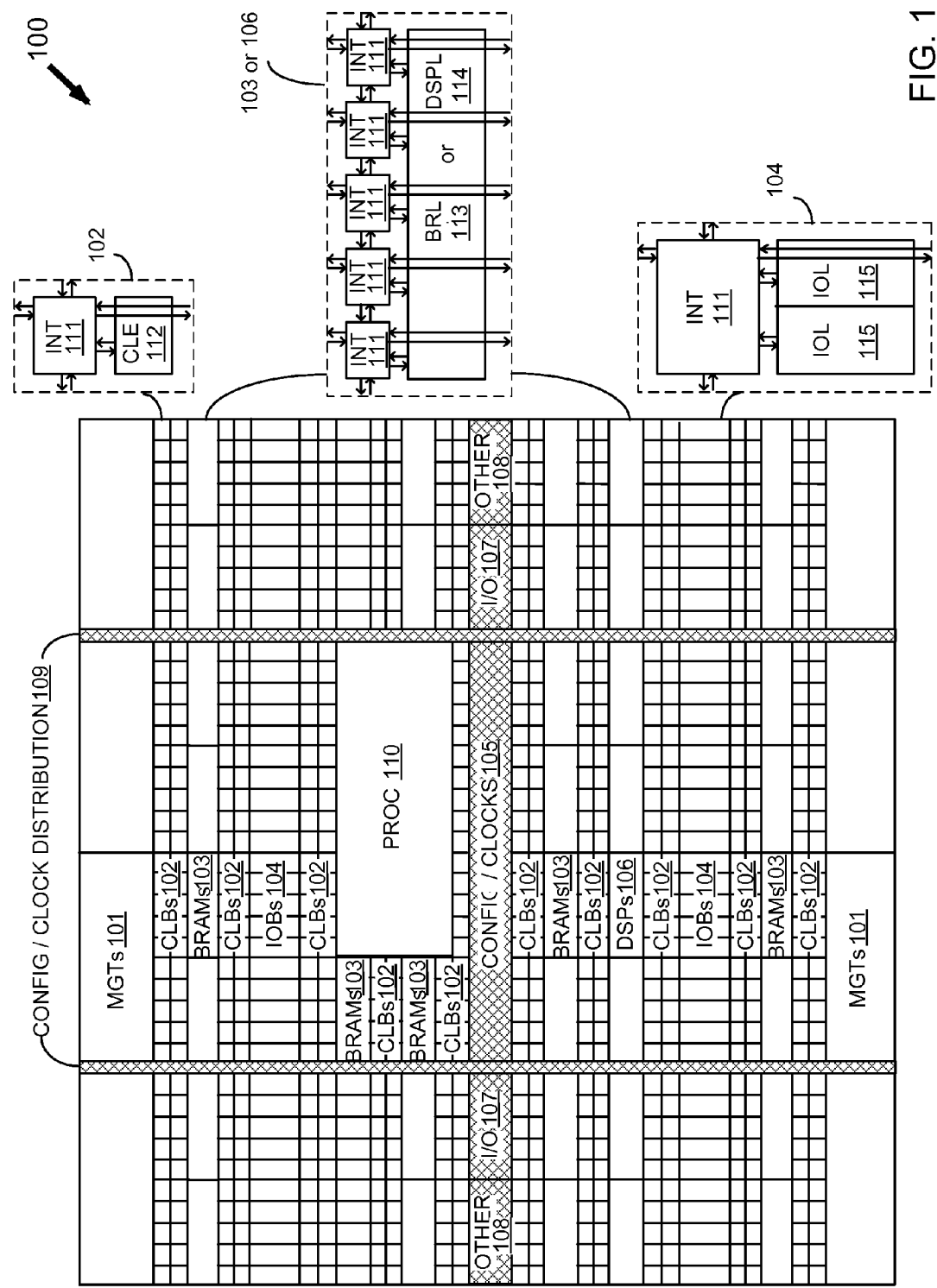
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent; however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

In the following description, for purposes of explanation, specific nomenclature is set forth to provide a thorough understanding of the various concepts disclosed herein. However, it will be apparent to one skilled in the art that these specific details are not required in order to practice the various concepts disclosed herein.

Some portions of the detailed descriptions that follow are presented in terms of algorithms and symbolic representations of operations on data bits or bytes within a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of electrical, optical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present system and methods also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform method steps. The structure for a variety of these systems will appear from the description below. In addition, the disclosure below is not described with reference to any particular programming language. It will be appreciated that a variety of programming languages may be used to implement the teachings as described herein.

Before describing the examples illustratively depicted in the several figures, a general introduction is provided to further understanding.

To allow booting, even in case where a primary flash image is corrupted, multi-boot or fallback boot functionality has been provided where multiple boot images may be stored on boot devices, such as boot images at predefined address offsets. Along those lines, in the event of failure of the first boot image, a boot code, such as a boot ROM code, may search for the next valid image using offset addressing.

Such a multi-boot or fallback image search by an system-on-chip ("SoC") may allow a first stage boot loader and/or user code to modify or update a multi-boot address or offset register, and then preform a soft reset, not a power-on-reset ("POR"), after which such boot ROM code may again start execution, though based on such updated value of a multi-boot address register. Along those lines, such boot ROM code may calculate or otherwise determine a new offset address for another or next boot image. For example, in the event that a first boot image found is not found to be valid, namely is found to be invalid, boot ROM code can itself increment a multi-boot address register value, dynamically create a revised filename, and try to boot from another boot image having such revised filename.

However, some types of boot devices, e.g., Secure Digital ("SD") cards, use a file system, not an offset addressing system, to access a boot image file or other file thereon. Because an SD boot may use a file system to search for a boot image file, which shall for purposes of clarity by way of example and not limitation be called "BOOT.BIN," an SD boot is not capable of offset updating a multi-boot address register to find another or next boot image.

To add the support for a multi-boot or fallback image search for a file-based boot mode, such as an SD boot mode for example, in an SoC, a register value, such as a multi-boot address register value, may be obtained and converted to a string value to generate a filename. For example, such conversion may be performed by concatenating a register value or number to a string called BOOT.BIN to produce a filename. For example, if a multi-boot address register has a value equal to d'123, then a boot image filename may be generated as "BOOT123.BIN". In which event, during a multi-boot or fallback image operation, boot ROM code may search for a boot image file having a filename "BOOT123.BIN" as stored on an SD device, such as an SD device card ("SD card") for example. If valid, such a boot image file may be loaded into such SoC as a user image.

An advantage of using an SD boot mode may be that a user can use single SD card with different boot images, and by naming files corresponding to such boot images as for example BOOT.BIN, BOOT1.BIN, BOOT2.BIN, and so on, a user can dynamically select a different boot image by updating a multi-boot address register value and then perform a soft reset, rather than a POR, to have such a selected boot image used in booting an SoC. Additionally, this facilitates use of an SD boot mode, which may be more convenient than other booting modes. Another advantage of boot ROM code incrementing and dynamically creating a new or revise filename is that an image search can be done for a valid image and an SoC system may be able to boot in the event of a first boot image is determined to be invalid.

With the above general understanding borne in mind, various embodiments for multi-booting or fallback image booting ("multi-booting") an SoC from a file-based boot device are generally described below.

Because one or more of the above-described examples are described herein using a particular type of IC, a detailed description of such an IC is provided below. However, it should be understood that other types of ICs and other apparatus may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
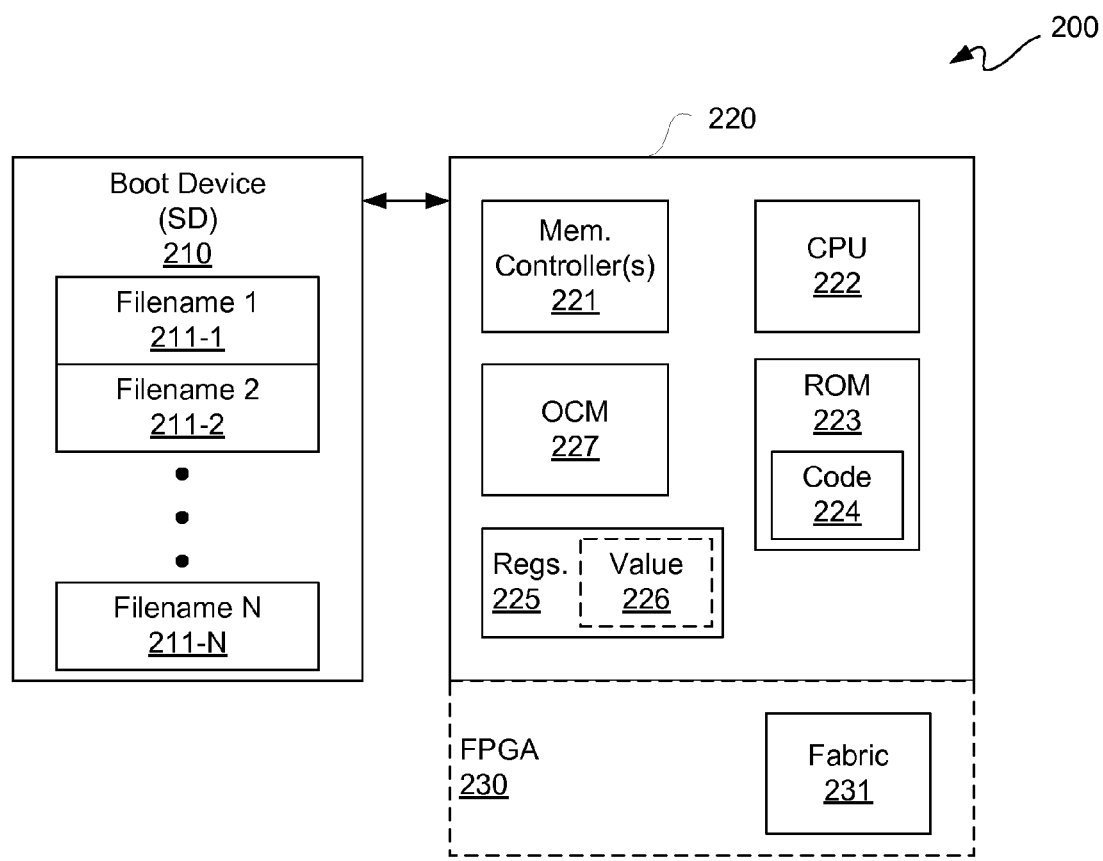
FIG. 2 is a block diagram depicting an exemplary multi-boot system.
Figure 3:
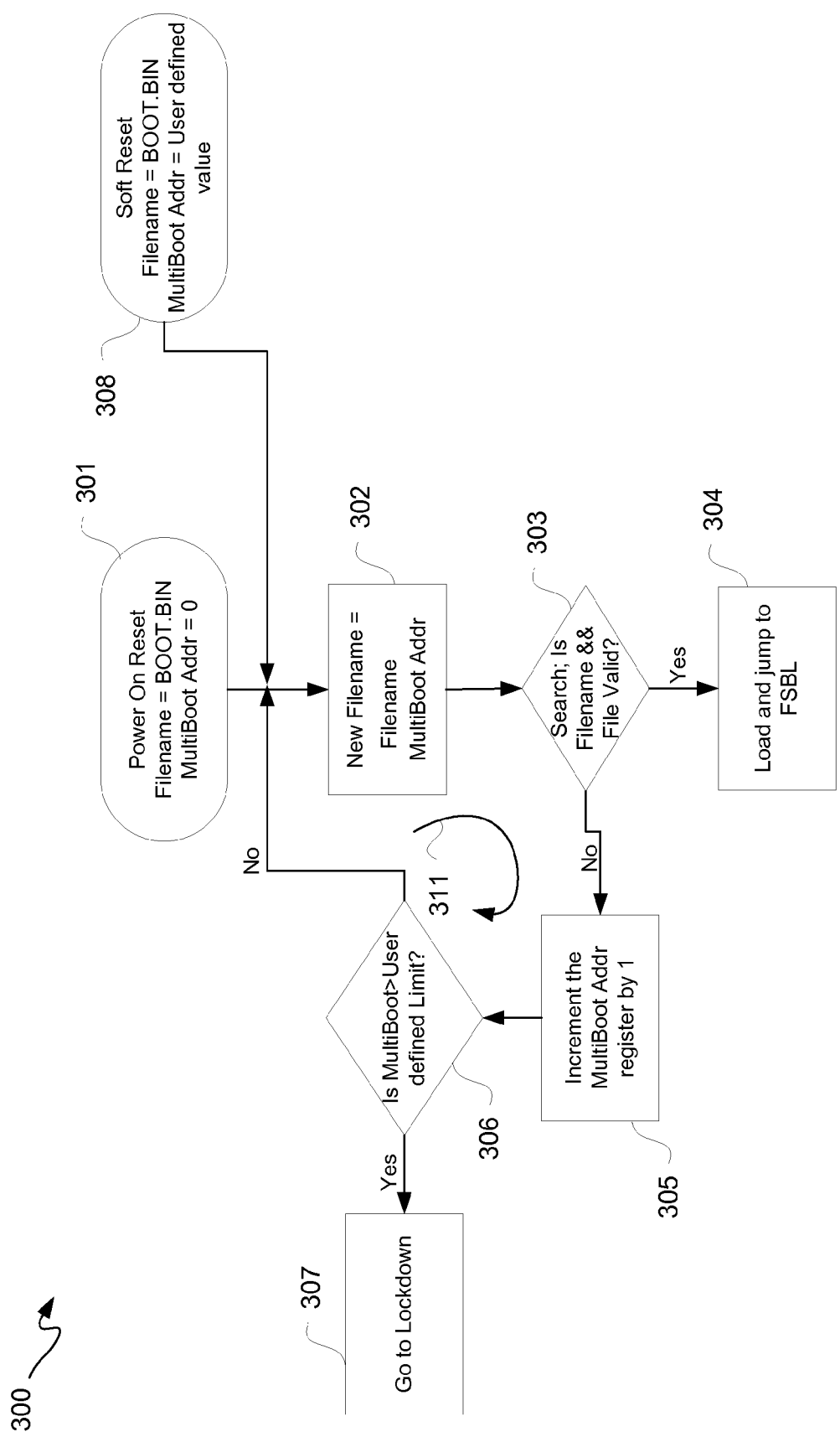
FIG. 3 is a flow diagram depicting an exemplary multi-boot flow.

FIG. 2 is a block diagram depicting an exemplary multi-boot system 200. FIG. 3 is a flow diagram depicting an exemplary multi-boot flow 300. Multi-boot flow 300 may be used with multi-boot system 200 of FIG. 2. Accordingly, multi-boot system 200 and multi-boot flow 300 are simultaneously described with simultaneous reference to FIGS. 2 and 3.

At 301, a boot of a system-on-chip ("SoC") 220 may be initiated. SoC 220 may be coupled to a boot device 210. Boot device 210 may be a Secure Digital ("SD") card or other file-based nonvolatile memory card format, whether for use in portable or non-portable devices, namely a format that uses files and associated filenames. Boot device 210 thus may generally be thought of as an external nonvolatile memory with files with respect to SoC 220. Boot device 210 is to be distinguished from other nonvolatile memory, such as other flash memory for example, including without limitation NOR flash and NAND flash, which allow for incremental offset addresses to access various header locations within such nonvolatile memory devices, as previously described. For example, various forms of Serial Peripheral Interface ("SPI") flash memories allow for an offset address with in such memories to be used to access a boot image. This allows for a reboot of an SoC 220 using such offset address to access for example a "golden" boot image stored in such flash memory, as described in additional detail in Chapter 6 of "Zynq-7000 All Programmable SoC Technical Reference Manual" published Nov. 16, 2012, by Xilinx, Inc. of San Jose, Calif., as User Guide 585 ("UG585") version 1.4 at pages 140-177. However, as previously indicated, SD cards are a popular form of storing files, such as for development of SoC systems, which heretofore were cumbersome for SD booting for reasons previously described herein.

At 301, a POR may be initiated to boot SoC 220 of multi-boot system 200. Such boot may be initiated from boot code 224 stored in on-chip or in-package nonvolatile memory, such as for example on-chip read-only memory ("ROM") 223, of SoC 220 responsive to such a POR. Boot code 224 may be masked programmed or otherwise irreversibly programmed in SoC 220, and as such, boot code 224 may be embedded in SoC 220. SoC 220 may include a processing unit, such as for example a central processing unit 222 which may be a single or multicore processing unit or a microprocessor, for controlling execution of boot code 224 from ROM 223. Any of a variety of processing units, such as from ARM, Intel, AMD, IBM, or others, may be used.

Under control of boot code 224, at 301 a register value 226 may be loaded into a register of registers 225 of SoC 220. Such register value 226 may be a default offset address value associated with access of a boot device 210, which for purposes of clarity by way of example not limitation shall be assumed be an SD card 210. However, again, it should be understood that other types of nonvolatile memory that use filenames to access information stored therein may be used. Along those lines, a memory controller of memory controllers 221 may use such a default offset address value to access SD card 210; however, as previously described an SD card 210 may not be used with offset addressing to access different locations within such device. Rather, as previously described, an SD card is file based.

Boot code 224 may include an initial filename string or name string, as well as such register value or address, as generally indicated at 301. At 301, such a filename may be accessed from boot code 224, and such a register value may be loaded into a register, as previously described. For purposes of clarity by way of example not limitation, it shall be assumed that such initial register value is a multi-boot address of zero and that such initial filename or name is BOOT.BIN. However, it should be understood that another multi-boot address value may be used and that any filename with a .BIN extension or other extension used to identify a boot image may be used.

At 302, responsive to execution of boot code 224, a register value may be obtained from register 225, such as a multi-boot offset register, for example. At 302, responsive to execution of boot code 224 such initial filename may have concatenated or otherwise appended thereto such initial multi-boot address, such as for example to provide BOOT0.BIN as a first filename. Effectively, this concatenation at 302 converts such a register value into a string value, and such a string value may be provided as an initial filename to an SD card 210.

At 303, a boot device, such as SD card 210, may be searched, which may be under control of boot code 224, for a boot image file having an initial or first filename. This is to determine at 303 if such filename generated at 302 is valid or not. SD card 210 may include one or more filenames 211. For purposes of clarity by way of example not limitation, it shall be assumed that SD card 210 includes N filenames 211-1 through 211-N for N a positive number greater than one. Along those lines, SD card 210 may include a plurality of boot image files for different configurations of SoCs and/or different configurations of SoC 220, including a boot image file for a configuration or reconfiguration of SoC 220. If at 303 a filename is found (e.g., BOOT123.BIN) and thus validated, then at 303 boot code 224 may be configured to validate such found boot image file at 303, such as by reading one or more header values of such found boot image file for example. If either a filename is not found at 303 or a boot image file found at 303 is found to not be valid at 303, then flow 300 proceeds to 305. In other words, both conditions of a valid filename and a valid boot image file associated therewith at 303 are to be true (i.e., a logical AND) for flow 300 to proceed to 304.

If at 303 such initial filename is not found in SD card 210, then at 305 a register value, such as multi-boot address registered in a multi-boot offset register 225, may be incremented, e.g., by one, to provide another register value, namely an incremented register value. Even though an example increment of one is used, it should be understood that other increments or symbols may be used to generate a succession of boot image filenames in accordance with the description hereof.

This incremented address is not used for accessing SD card 210, rather the initial or default address is used for accessing a boot device, such as SD card 210, via a memory controller therefor of memory controllers 221. Rather, this incremented address is for generating another filename, as described below in additional detail. Therefore, this incremented address need not, though may, be written to multi-boot offset register 225. Along those lines, a storage device, which may be offset register 225, is used which persistent across soft resets of SoC 220, so that a user can change such stored value and do a soft reset to again start a booting process. In an instance where or when boot code 224 itself does increment an address or value of a registers, such as offset register 225 for example, this new value is also used by a next "bootloader" or boot loader, such as for example a first stage boot loader ("FSBL") or another downstream boot loader, to get each next consecutive configuration and/or processor image for SoC 220. In this example, incrementing of an offset address register 225 is used generally to inform boot code 224 and an FSBL, such as for example a file 211-1 or other file of boot device 210, about a new or next boot image to search and to use this new or next image from SD card 210.

At 306, it may be determined whether a multi-boot address has been incremented passed a threshold value or number of times, which may be a user defined limit. In other words, at 306 it may be determined whether a number of iterations around the loop 311 exceeds a threshold value. If at 306 it is determined that such threshold value has been exceeded, then at 307 a lockdown mode may be invoked, which may lock registers 225 among other subsystems of SoC 220. Such a lockdown mode may be invoked such that only a POR of SoC 220 may be used to exit such locked down condition.

If at 306 it is determined that a threshold value has not been exceeded for iterations around loop 311, then at 302 another filename may be created by concatenating an initial filename with such multi-boot address incremented at 305. For example, at 302, responsive to continued execution of boot code 224 such initial filename has concatenated or otherwise appended thereto such a current multi-boot address, such as for example to provide BOOT1.BIN as a second filename.

Operations around loop 311, namely operations at 302, 303, 305, and 306, may be iteratively repeated until a threshold limit is exceeded, or before then, a valid file is found at 303. A valid filename for a boot image file therefor may be iteratively generated. Assuming for example that such second filename or subsequent filename thereto is found in SD card 210 at 303, then at 304 a boot image of such found and validated boot image file in SD card 210 may be loaded at 304 into on-chip memory ("OCM") 227 of SoC 220. Such a loaded boot image may be executed from OCM 227 under control of CPU 222.

Thus, generally at 303 a succession of filenames 211-1 through 211-N stored in a boot device, such as SD card 210 for example, may be searched through until a valid filename is found, or no valid filename is found that corresponds to a current filename generated at 302. If a valid filename is found at 302, whether on an initial or subsequent iteration of loop 311, a boot image file having such filename may be loaded at 304, namely a boot image may be loaded into OCM 227 of SoC 220, for execution. Such boot image file may call for a jump to a first stage boot loader ("FSBL"). Such FSBL may be an image file stored on SD card 210. Additionally, a second stage boot loader ("SSBL") image file, an operating system ("OS") image file, a configuration information image file, an application image file, or another type of image file may be stored on SD card 210. For example, after having found a valid boot image file, a jump to an FSBL may cause invocation of an OS image file, such as of files 211, to be loaded into OCM 227 for execution under control of CPU 222.

Furthermore, loading of a valid boot image file may provide command line control for SoC 220. From command line control, a registered value in multi-boot offset register 225 may be modifiable or changeable. Along those lines, a different initial multi-boot address may be written to a multi-boot offset register 225 for a subsequent soft reset at 308 of SoC 220. From such soft reset at 308 such user-defined multi-boot address may be used at 304 for concatenating with a BOOT-.BIN filename or other filename, such as previously described.

Optionally, SoC 220 may include reprogrammable resources of a programmable logic device, such as FPGA fabric 231 of FPGA subsystem 230. Along those lines, a configuration information image file stored in SD card 210 may be loaded into configuration memory of FPGA fabric 231 for instantiating one or more circuits in reprogrammable resources thereof.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
   initiating a boot of a system-on-chip coupled to a boot device;
   wherein the boot is initiated from boot code stored in nonvolatile memory of the system-on-chip responsive to a power-on-reset; and
   under control of the boot code, performing the following operations:
      loading a first register value into a register of the system-on-chip;
      accessing a name string from the boot code;
      obtaining the first register value from the register;
      converting the first register value and the name string to a first string value;
      wherein the first string value is provided as a first filename;
      searching the boot device for a boot image file with the first filename; and
      in response to finding the first filename in the boot device,
         validating the boot image having the first filename; and
      in response to the boot image being invalid,
         incrementing the first register value to provide a second register value; and
         repeating the obtaining, converting, and searching using a second filename generated using the second register value, wherein a valid filename for the boot image file is iteratively generated;
      if the first filename is not found in the boot device,
         incrementing the first register value to provide the second register value; and
         repeating the obtaining, converting, and searching using the second filename generated using the second register value, wherein a valid filename for the boot image file is iteratively generated.

2. The method according to claim 1, wherein the boot device comprises a Secure Digital card having stored thereon a plurality of boot image files with associated filenames.

3. The method according to claim 1, wherein:
   the boot device comprises an external nonvolatile memory with respect to the system-on-chip;
   the boot device has stored therein a plurality of boot image files with associated filenames; and
   the method further comprises:
      searching through a succession of the filenames, including the first filename and the second filename, stored in the boot device until the valid filename is found; and
      loading a boot image of the boot image file validated.

4. The method according to claim 1, wherein:
   the boot device comprises an external nonvolatile memory with respect to the system-on-chip;
   the boot device has stored therein a plurality of boot image files with associated filenames; and
   the method further comprises:
      searching through a succession of the filenames, including the first filename and the second filename, stored in the boot device until the valid filename is found or a threshold number of iterations is exceeded;
      initiating a lockdown mode if the threshold number of iterations is exceed; and
      loading the boot image file having the valid filename if found before the threshold number of iterations is exceeded.

5. The method according to claim 1, wherein the boot device includes a plurality of boot image files including the boot image file for different system-on-chip configurations including a configuration for the system-on-chip.

6. The method according to claim 1, further comprising:
   validating the second filename or a subsequent filename thereto;
   validating the boot image file associated with the second filename or the subsequent filename thereto;
   loading a boot image of the boot image file validated; and
   jumping to a boot loader image stored in the boot device.

7. The method according to claim 1, wherein the converting comprises appending the first register value to the name string to generate the first filename.

8. The method according to claim 1, further comprising:
   validating the second filename or a subsequent filename thereto;
   validating the boot image file associated with the second filename or the subsequent filename thereto;
   loading a boot image of the boot image file validated; and
   providing command line control responsive to the boot image loaded;
   wherein from the command line control the first register value is changeable.

9. The method according to claim 8, wherein the system-on-chip is bootable from a soft reset using the first filename as associated with a user-defined value for a multi-boot address for the first register value.

10. The method according to claim 8, wherein the register comprises a multi-boot offset register.

11. The method according to claim 8, wherein the system-on-chip comprises reprogrammable resources of a programmable logic device subsystem.

12. A system, comprising:
- a system-on-chip having a central processing unit, on-chip memory, internal nonvolatile memory, a register, and a memory controller; and
- an external nonvolatile memory coupled to the system-on-chip;
- wherein the external nonvolatile memory is configured to store files with associated filenames;
- wherein the internal nonvolatile memory includes executable boot code which is configured, under control of the central processing unit, to:
  - access a name string;
  - load a register value into the register of the system-on-chip;
  - obtain the register value from the register; and
  - convert the register value and the name string to a string value;
  - wherein the string value is provided as a filename;
- wherein the system-on-chip is coupled to search the external nonvolatile memory for a boot image file with the filename; and
- wherein the system-on-chip is configured to successively increment the register value to successively search the external nonvolatile memory for a valid filename for the boot image file;
- wherein the system-on-chip is configured to, in response to finding the filename in the boot device,
- validate the boot image having the filename; and
- in response to the boot image being invalid,
  - increment the register value to provide another register value; and
  - repeat the obtaining, converting, and searching using another filename generated using the other register value.

13. The system according to claim 12, wherein:
- the system-on-chip is configured to be booted responsive to a soft reset thereof; and
- the register value comprises a user-definable register value for the soft reset.

14. The system according to claim 12, wherein the register value comprises a multi-boot address.

15. The system according to claim 12, wherein the register comprises a multi-boot offset register.

16. The system according to claim 12, wherein the system-on-chip comprises reprogrammable resources of a programmable logic device subsystem.

17. The system according to claim 12, wherein the external nonvolatile memory comprises a Secure Digital card having stored thereon a plurality of boot image files with the associated filenames.

18. A program product for embedding in a system-on-chip coupled to a boot device, the program product stored on a non-transitory processing unit-readable storage medium comprising:
- a processing unit-readable program;
- wherein the processing unit-readable program is executed by the system-on-chip for causing the system-on-chip to perform operations comprising:
  - loading a first register value into a register of the system-on-chip;
  - obtaining the first register value from the register;
  - accessing a name string from the processing unit-readable program;
  - converting the first register value and the name string to a first string value; wherein the first string value is provided as a first filename;
  - searching the boot device for a boot image file with the first filename;
  - in response to finding the first filename in the boot device, validating the boot image having the first filename; and
  - in response to the boot image being invalid,
    - incrementing the first register value to provide a second register value; and
    - repeating the obtaining, converting, and searching using a second filename generated using the second register value, wherein a valid filename for the boot image file is iteratively generated; and
  - if the first filename is not found in the boot device,
    - incrementing the first register value to provide the second register value; and
    - repeating the obtaining, converting, and searching using the second filename generated using the second register value, wherein a valid filename for the boot image file is iteratively generated.

19. The program product according to claim 18, wherein the processing unit-readable program is executed by the system-on-chip for causing the system-on-chip to perform operations further comprising:
- searching through a succession of filenames stored in the boot device, including the first filename and the second filename, stored in the boot device until the valid filename is found; and
- loading the boot image file having the valid filename.

20. The program product according to claim 19, wherein the processing unit-readable program is executed by the system-on-chip for causing the system-on-chip to perform operations further comprising:
- validating the second filename and the boot image file associated therewith or a subsequent filename and a subsequent boot image file thereto; and
- loading a boot image of the boot image file validated.

* * * * *